US008678731B2

(12) United States Patent
Sakakura et al.

(10) Patent No.: US 8,678,731 B2
(45) Date of Patent: Mar. 25, 2014

(54) NUT AND A HOUSING

(75) Inventors: Kouji Sakakura, Yokkaichi (JP); Hiroyuki Matsuoka, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 782 days.

(21) Appl. No.: 12/509,526

(22) Filed: Jul. 27, 2009

(65) Prior Publication Data

US 2010/0034613 A1 Feb. 11, 2010

(30) Foreign Application Priority Data

Aug. 7, 2008 (JP) ................................. 2008-204611

(51) Int. Cl.
*F16B 39/00* (2006.01)

(52) U.S. Cl.
USPC ............................................. 411/104; 411/92

(58) Field of Classification Search
USPC ............. 411/84, 92, 104, 427, 111, 166, 169, 411/174, 175, 93, 965, 966, 971, 119, 120; 439/801, 813
See application file for complete search history.

(56) References Cited

U.S. PATENT DOCUMENTS

| | | | | |
|---|---|---|---|---|
| 1,820,064 | A * | 8/1931 | Green | 52/481.2 |
| 2,611,633 | A * | 9/1952 | Webster | 403/7 |
| 2,624,386 | A * | 1/1953 | Russell | 411/177 |
| 2,921,320 | A * | 1/1960 | Lantz | 248/27.1 |
| 3,233,501 | A * | 2/1966 | Buren, Jr. | 411/527 |
| 3,646,982 | A * | 3/1972 | Cushman | 411/82.5 |
| 3,969,011 | A * | 7/1976 | Yamada | 439/569 |
| 4,055,737 | A * | 10/1977 | Rasmussen | 200/51 R |
| 4,099,274 | A * | 7/1978 | Emberson | 4/286 |
| 4,861,182 | A * | 8/1989 | Gillet | 403/264 |
| 5,493,085 | A | 2/1996 | Kolberg et al. | |
| 5,580,286 | A * | 12/1996 | Kramer et al. | 439/813 |
| 5,595,505 | A | 1/1997 | Duke et al. | |
| 5,795,117 | A * | 8/1998 | Onoda | 411/92 |
| 6,027,293 | A * | 2/2000 | Beemer et al. | 411/119 |
| 6,102,750 | A * | 8/2000 | Little et al. | 439/813 |
| 6,234,850 | B1 | 5/2001 | Pandit et al. | |
| 6,379,196 | B1 * | 4/2002 | Greenberg et al. | 439/801 |
| 6,854,941 | B2 * | 2/2005 | Csik | 411/112 |
| 6,918,725 | B2 * | 7/2005 | Gauron | 411/112 |
| 6,981,901 | B2 * | 1/2006 | Takaya | 439/812 |
| 7,115,000 | B1 | 10/2006 | Huang | |
| 2006/0270252 | A1 | 11/2006 | Muto et al. | |
| 2009/0124121 | A1 | 5/2009 | Matsuoka | |

FOREIGN PATENT DOCUMENTS

JP 2006-031962 2/2006

* cited by examiner

*Primary Examiner* — Flemming Saether
(74) *Attorney, Agent, or Firm* — Gerald E. Hespos; Miachel J. Porco; Matthew T. Hespos

(57) ABSTRACT

A nut (30) includes a main portion (30A) formed with a bolt insertion hole (31), into which a bolt is insertable, and a wedge portion (30B) projecting from the main portion (30A) in a radially outward direction of the bolt insertion hole (31) and having a width smaller than that of the main portion (30A). Thus, parts (27B) extending lateral to the wedge portion (30B) in parallel with a projecting direction of the wedge portion (30B) can be made thicker than parts (27A) extending lateral to the main portion (30A). Therefore, the parts (27B) that resist an accompanying rotation of the nut (30) can be thickened without enlarging a housing (20), with the result that strength against the accompanying rotation of the nut (30) can be ensured.

15 Claims, 4 Drawing Sheets

NUT AND A HOUSING

BACKGROUND OF THE INVENTION

1. Field of the Invention

The invention relates to a nut and a housing that has a nut accommodating portion.

2. Description of the Related Art

Terminals often are connected by tightening to a nut and a bolt. Japanese Unexamined Patent Publication No. 2006-31962, for example, shows a housing for holding such terminals and includes a nut accommodating portion for accommodating a nut that can be tightened to a bolt. The nut has a substantially rectangular planar shape and the nut accommodating portion includes a peripheral wall that surrounds the nut. The peripheral wall prevents an accompanying rotation of the nut in the nut accommodating portion during a bolt tightening operation.

The peripheral wall of the nut accommodating portion must have sufficient strength to resist an accompanying rotation of the nut. However, an increase of the thickness of the peripheral wall to ensure sufficient strength increases the size of the housing. Therefore a countermeasure is hoped for.

The present invention was developed in view of the above situation and an object thereof is to provide a nut and a housing capable of ensuring strength against an accompanying rotation of the nut without enlarging the housing.

SUMMARY OF THE INVENTION

The invention relates to a nut with a main portion that has a bolt insertion hole for receiving a bolt. The nut also has a wedge that projects from the main portion in a radially outward direction of the bolt insertion hole. The wedge is narrower than the main portion.

The projecting end of the wedge is displaced most by an accompanying rotation of the nut. However, the wedge is narrower than the main portion. Therefore, parts extending lateral to the wedge and parallel to the projecting direction of the wedge can be made thicker than parts extending lateral to the main portion. Thus, the parts that resist the accompanying rotation of the nut can be thickened without enlarging the housing, and as a result the strength against accompanying rotation of the nut can be ensured.

The wedge and the main portion preferably have substantially equal thicknesses.

The bolt insertion hole preferably is formed at a position substantially corresponding to the center of gravity of the main portion.

The invention also relates to a housing with a nut accommodating portion for accommodating the above-described nut. The nut accommodating portion has an accompanying rotation preventing portion located lateral to the wedge of the nut and extending substantially in parallel with a projecting direction of the wedge. The nut and the housing ensure strength against an accompanying rotation of the nut without enlarging the housing.

The housing preferably has a plurality of nut accommodating portions arranged substantially side by side in a width direction of the housing and at least one nut accommodating portion is at a different height than an adjacent nut accommodating portion.

The nut preferably is press-fit into the nut accommodating portion through an opening of the nut accommodating portion and is held therein.

An escaping hole preferably is formed in correspondence of the nut accommodating portion, and a bolt can project into the escaping hole after passing down through the bolt insertion hole of the nut.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
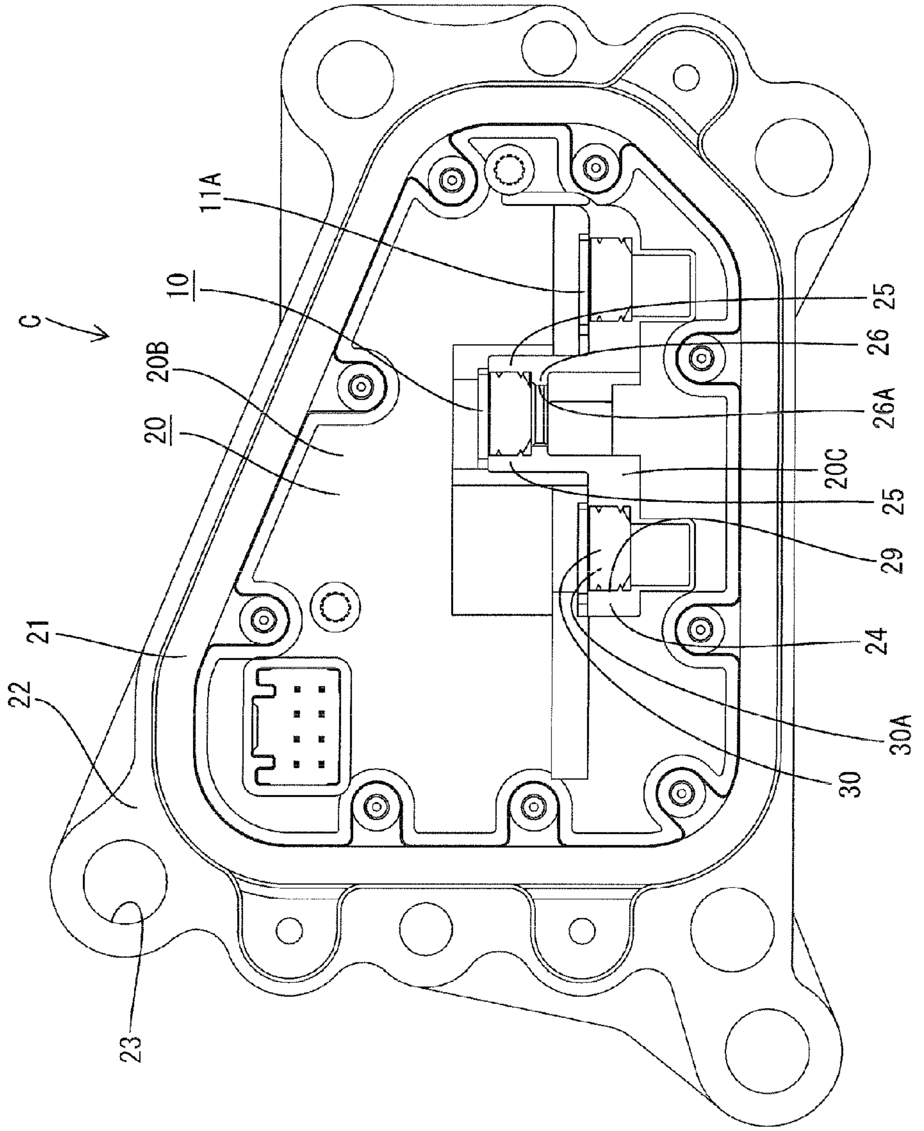
FIG. 1 is a rear view of a connector according to one embodiment.
Figure 2:
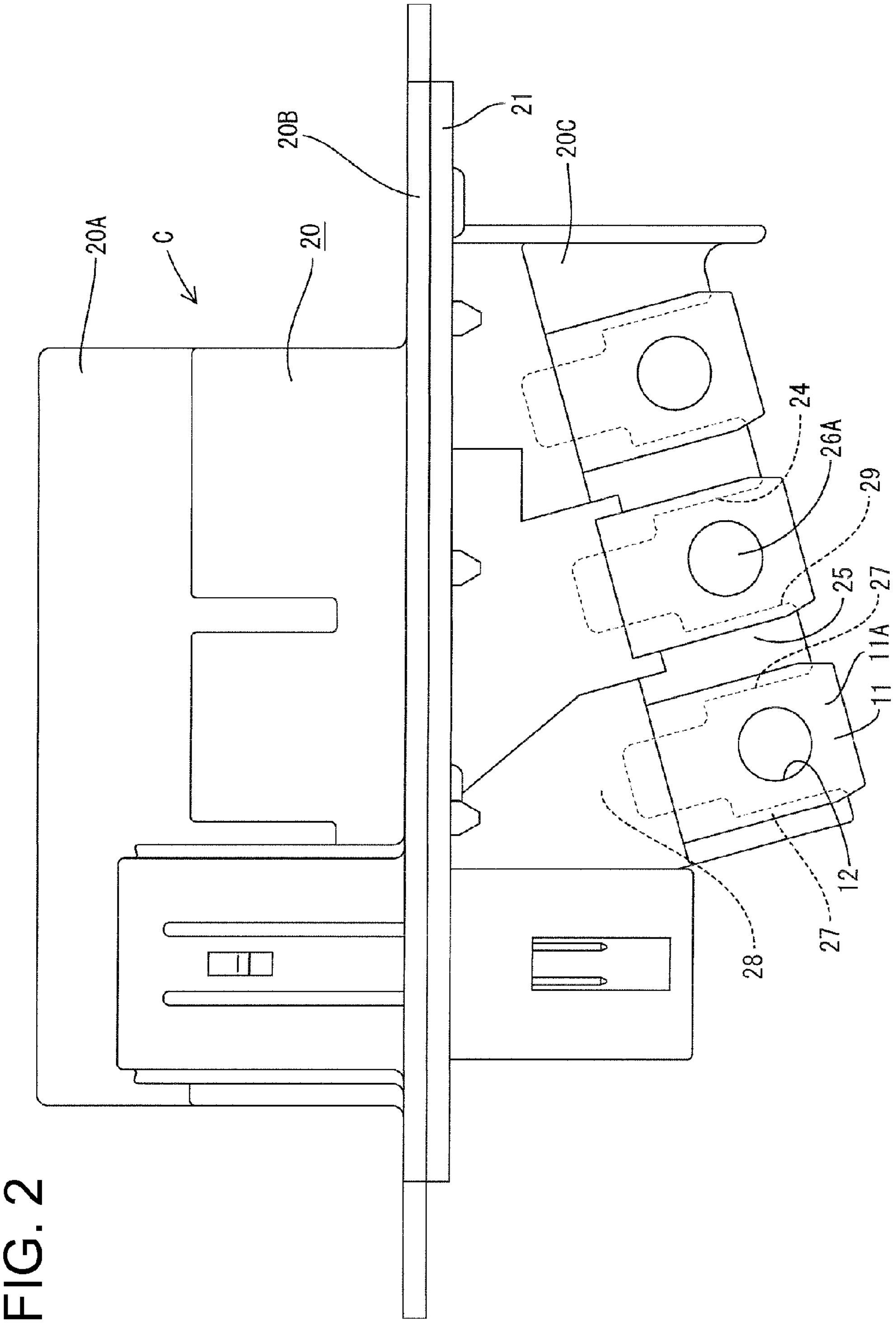
FIG. 2 is a top view of a housing.

A device connector in accordance with the invention is identified by the letter C in FIGS. 1 and 2 and is intended for supplying power to an unillustrated electric or electronic device (e.g. motor, inverter, junction box or the like installed, for example, in a hybrid vehicle). The connector C is installed in a conductive case (not shown) that accommodates the device. In the following description, upper and lower sides of FIG. 1 are referred to as upper and lower sides and an upper side (harness side) and a lower side (device side) of FIG. 2 are referred to as front and rear.

The connector C includes terminals 10 to be connected with unillustrated harness-side and/or device-side terminals by bolt tightening and a housing 20 for holding the terminals 10.

The housing 20 is made e.g. of synthetic resin and includes a harness-side projection 20A that projects out from the case, a flange 20B that faces an outer surface of the case and a device-side projection 20C in the case (see FIG. 2). The harness-side projection 20A, the flange 20B and the device-side projection 20C are formed unitarily.

The harness-side projection 20A is a wide box having a hollow interior and connectable with a harness-side connector (not shown) connected with an end of an unillustrated wiring harness.

The flange 20B is a plate that widens laterally from the rear end of the harness-side projection 20A. A seal ring 21 is mounted on a peripheral portion of the rear surface of the flange 20B facing the case (see FIG. 1). The seal ring 21 is made of a resilient material such as rubber and is sized to surround an unillustrated mount hole of the case into which the connector C is mounted.

The device-side projection 20C projects back from the rear surface of the flange 20B.

A shielding shell 22 is mounted on and covers the front surface of the flange 20B, which is the surface facing away from the case. The shielding shell 22 is aluminum die-cast and has an outer shape slightly larger than the flange 20B. Fixing holes 23 penetrate a peripheral portion of the shielding shell 22. The connector C can be fixed to the case by inserting unillustrated bolts into the respective fixing holes 23 and tightening the bolts into the case.

Terminals 10 are held in the housing 20 by insert molding. Each terminal 10 has a harness-side connecting portion in the harness-side projection 20A and configured to connect with the harness-side terminal. Each terminal 10 also has a device-side connecting portion 11A in the device-side projection 20C and configured to connect to the device-side terminal.

The connecting portions of each terminal 10 are formed with substantially round bolt holes 12 and are connected strongly with the harness-side terminal and the device-side terminal by tightening metal bolts (not shown).

The harness-side projection 20A and the device-side projection 20C include nut accommodating portions 24 for accommodating nuts 30 for bolt tightening.

Figure 3:
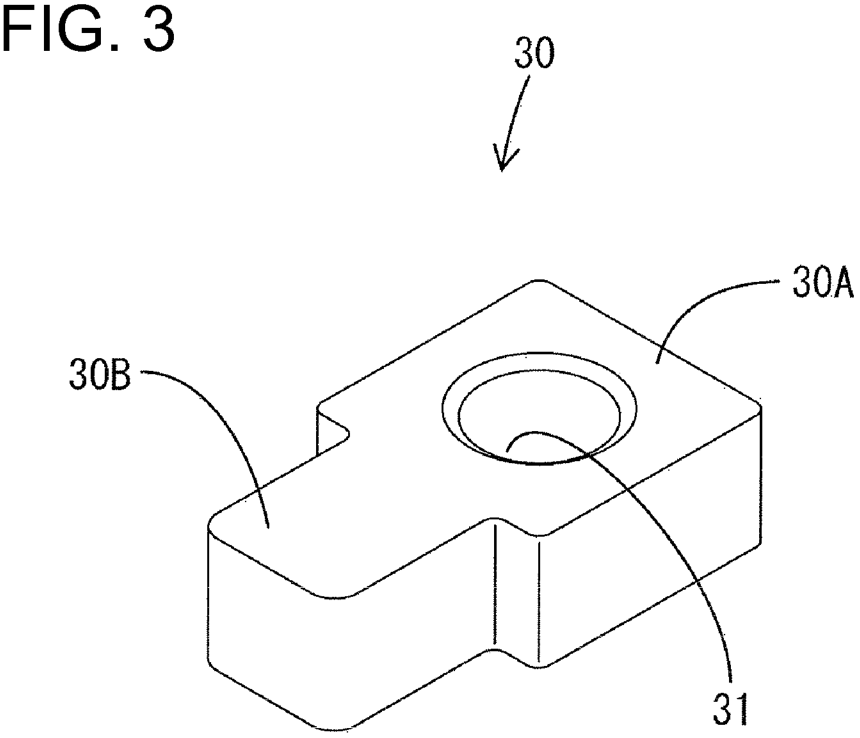
FIG. 3 is a perspective view of a nut.

Each nut 30 is made of metal and includes a main portion 30A with a bolt insertion hole 31 for receiving a bolt and a wedge 30B that projects from the main portion 30A in a radial direction from the bolt, as shown in FIG. 3.

The main portion 30A is substantially rectangular or polygonal in a plan view and the bolt insertion hole 31 is formed at a substantially central position or center of gravity position thereof.

Figure 4:
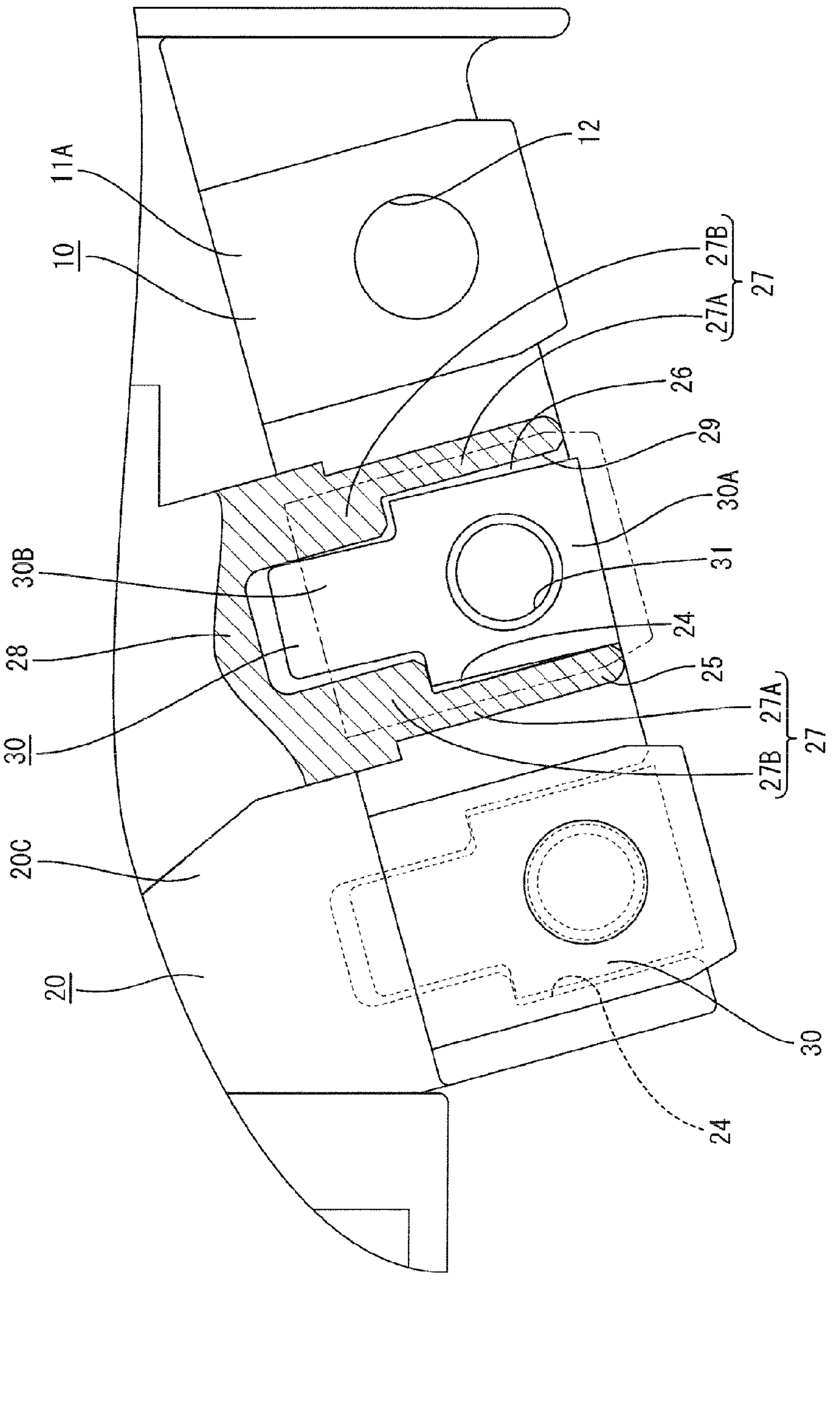
FIG. 4 is a conceptual diagram showing a state where an accompanying rotation of the nut is prevented.

The wedge 30B projects from a widthwise central position of one of four sides on the periphery of the main portion 30A and has defines a rectangle that is slightly longer in a projecting direction (see FIG. 4). The width of the wedge 30B is smaller than the width of the main portion 30A and substantially constant in a longitudinal direction. The opposite side surfaces of the wedge 30B are formed at positions retracted inwardly from the opposite side surfaces of the main portion 30A by substantially the same distance. The thicknesses of the wedge 30B and the main portion 30A are substantially equal.

The nut accommodating portions 24 in the device-side projection 20C are described here and are shown in the drawings. The nut accommodating portions 24 of the harness-side projection 20A are not shown, but are structurally similar to those of the device-side projection 20C.

The nut accommodating portions 24 are arranged side by side in a width direction of the housing 20 and the adjacent nut accommodating portions 24 are at different heights. Specifically, the middle of the nut accommodating portions 24 is above those at the opposite ends, and the end nut accommodating portions 24 are at substantially the same height with respect to a bolt mounting or tightening direction (see FIG. 1).

The nut accommodating portions 24 are recessed and have substantially the same planar shape as the nuts 30. The device-side connecting portions 11A of the respective terminals 10 are arranged on the upper surfaces of the respective nut accommodating portions 24.

Each nut accommodating portion 24 includes a peripheral wall 25 that partly surrounds the nut 30 and a bottom wall 26 arranged below the nut 30. The peripheral wall 25 has two side walls 27 arranged at the opposite sides of the nut 30 and a front wall 28 arranged at the front side of the nut 30. An opening 29 is formed in the rear side of the peripheral wall 25 (see FIG. 2).

The nuts 30 are press-fit through the openings 29 and into the nut accommodating portions 24 so that the axial lines of the bolt insertion holes 31 are aligned substantially parallel with a vertical direction, and so that their upper surfaces are arranged along the lower surfaces of the device-side connecting portions 11A of the terminals 10. An escaping hole 26A is formed in the bottom wall 26 of each nut accommodating portion 24, and the bolt tightening the terminal 10 projects into the escaping hole 26A after passing down through the bolt insertion hole 31 of the nut 30. Clearances are shown in FIG. 4 between the nuts 30 and the nut accommodating portions 24 to make the shapes of the nuts 30 and the nut accommodating portions 24 easily understandable.

Rear parts of the side walls 27 define main side wall portions 27A and are arranged at opposite sides of the main portion 30A of the nut 30. Front parts of the side walls 27 define wedge side wall portions 27B and are arranged at opposite sides of the wedge 30B. The wedge side wall portions 27B are at front and rear sides of the wedge 30B in a rotating direction of the nut 30 and are substantially parallel with a projecting direction of the wedge 30B. A distance between the side walls 27 is so set that the nut 30 can be press-fit. Thus, a distance between the main side wall portions 27A is slightly smaller than the width of the main portion 30A and a distance between the wedge side wall portions 27B is slightly smaller than the width of the wedge 30B.

The main side wall portions 27A and the wedge side wall portions 27B have constant respective thicknesses. However, the wedge side wall portions 27B are thicker than the main side wall portions 27A by as much as the width of the wedge 30B is smaller than the width of the main portion 30A and about twice the thickness of the main side wall portions 27A. The wedge side wall portions 27B project more toward the facing sides than the main side wall portions 27A, and the outer side surfaces of the side walls 27 (surfaces opposite to the facing surfaces) are flat in forward and backward directions. The outer side surfaces of the side walls 27 of the adjacent nut accommodating portions 24 are substantially parallel.

Each nut 30 includes the main portion 30A formed with the bolt insertion hole 31 and the wedge 30B projecting from the main portion 30A in a direction radially out from the bolt insertion hole 31. The wedge 30B is narrower than the main portion 30A.

The nut 30 may exhibit accompanying rotation as a bolt is tightened, and a circumferential displacement is larger at farther distances from an axis of rotation for any given angle of rotation. Thus, the projecting end of the wedge 30B is subject to maximum displacement in response to accompanying rotation of the nut 30. Accordingly, the projecting end of the wedge 30B contacts the wedge side wall portion 27B more strongly than other parts in response to accompanying rotation of the nut 30 as the bolt is tightened. Thus, the main side wall portions 27A need not have strength to resist the accompanying rotation and the thickness of the main side wall portions 27A can be reduced.

The wedge 30B is narrower than the main portion 30A. Thus, the wedge side wall portions 27B can be thicker than the main side wall portions 27A in directions parallel with the projecting direction of the wedge 30B. In other words, the wedge side wall portions 27B can be thickened without causing them to project out from the main portion-side wall portions 27A. Thus, the thickness of the wedge side wall portions 27B that resist the accompanying rotation of the nut 30 can be increased without enlarging the housing 20, with the result that strength against accompanying rotation of the nut 30 can be ensured.

The invention is not limited to the above described and illustrated embodiment. For example, the following embodiments are also included in the technical scope of the present invention.

Although the invention is applied to the nuts 30 to be accommodated into the housing 20 of the connector C in the above embodiment, it is applicable to nuts to be accommodated in any device.

The main portion 30A has a substantially rectangular planar shape in the above embodiment. However, the shape of the main portion need not be rectangular since the accompanying rotation of the nut 30 is prevented by the wedge 30B. For example, the main portion may be round or any shape.

The rectangular wedge 30B projects from the rectangular main portion 30A in the above embodiment. However, the entire nut may have a substantially isosceles triangular planar shape and a bolt insertion hole may be at a position near a bottom side. In this case, a part of the entire nut near the bolt insertion hole is the main portion and a tapered part is the wedge.

The nut 30 is press-fit laterally into the nut accommodating portion 24 in the above embodiment. However, the nut may be held by placing the connecting portion of the terminal on the upper surface of the nut accommodating portion after being accommodated into the nut accommodating portion from above.

Plural nut accommodating portions 24 are arranged side by side in the width direction in the illustrated embodiment. However, only one nut accommodating portion may be provided.

Although adjacent nut accommodating portions 24 are at different heights in the illustrated embodiment, they may be at the same heights.

What is claimed is:

1. A housing assembly, comprising:

a nut that has a main portion with a bolt insertion hole extending along an axial direction and configured for receiving a bolt, the main portion having opposite parallel side surfaces aligned substantially parallel to the axial direction of the bolt hole and being spaced apart by a width dimension and a wedge projecting from the main portion in direction aligned radially to the bolt insertion hole and normal to the width direction of the main portion the wedge having opposite parallel side surfaces spaced inward from the side surfaces of the main portion and defining a constant width dimension narrower than the width dimension of the main portion; and a housing with a nut accommodating portion, the nut accommodating portion having a bottom wall and opposed side walls extending up from the bottom wall to define opposed substantially parallel main side wall portions disposed for engaging the opposite side surfaces of the main portion of the nut and opposed substantially parallel wedge side wall portions disposed for engaging opposite side surfaces of the wedge, the wedge side wall portions of the side walls being thicker than the main side wall portions for preventing an accompanying rotation of the nut.

2. The nut housing assembly of claim 1, wherein thicknesses of the wedge and the main portion in directions parallel to the axial direction of the bolt hole are substantially equal.

3. The nut housing assembly of claim 1, wherein the bolt insertion hole is at a position substantially corresponding to a center of gravity position of the main portion.

4. The housing of claim 1, wherein a plurality of nut accommodating portions are arranged substantially side by side in a width direction of the housing and at least part of the adjacent nut accommodating portions are formed at different heights.

5. The housing of claim 1, wherein the nut accommodating portion has an opening for receiving the nut.

6. The housing of claim 1, wherein an escaping hole is formed in correspondence of the nut accommodating portion, and a bolt can project into the escaping hole after passing downward through the bolt insertion hole of the nut.

7. A housing, comprising:

at least one nut accommodating portion having a bottom wall with opposite front and rear ends, a bolt escaping hole formed in the bottom wall, a rear wall projecting up from the rear end of the bottom wall, first and second opposed side walls extending up from the bottom wall and extending forward from the rear wall to the front end of the bottom wall, the side walls having a first portion adjacent to the front end with a first thickness and a second portion adjacent to the rear end and having a second thickness larger than the first thickness, and an intermediary portion between and at a right angle to the first and second portions.

8. The housing of claim 7, wherein portions of the side wall that have the second thickness extend from the front end of the bottom wall to positions rearward of the bolt escaping hole.

9. The housing of claim 7, wherein the nut accommodating portion has an open front end between the side walls.

10. The housing of claim 7, wherein facing surfaces of the side walls are substantially parallel.

11. The housing of claim 7, wherein the at least one nut accommodating portion comprise at least first and second nut accommodating portions.

12. The housing of claim 11, wherein the bottom wall of the first nut accommodating portion is offset from the bottom wall of the second nut accommodating portion.

13. A housing assembly, comprising:

a nut that has a main portion with a bolt insertion hole for receiving a bolt and a wedge projecting from the main portion in direction aligned radially to the bolt insertion hole, the wedge being narrower than the main portion; and a housing with a plurality of nut accommodating portions, the nut accommodating portions having a bottom wall and opposed side walls extending up from the bottom wall to define opposed substantially parallel main side wall portions disposed for engaging opposite side surfaces of the main portion of the nut and opposed substantially parallel wedge side wall portions disposed for engaging opposite side surfaces of the wedge, the wedge side wall portions of the side walls being thicker than the main side wall portions for preventing an accompanying rotation of the nut, wherein the plurality of nut accommodating portions are arranged substantially side by side in a width direction of the housing and at least part of the adjacent nut accommodating portions are formed at different heights.

14. The housing of claim 13, wherein the nut accommodating portion has an opening for receiving the nut.

15. The housing of claim 13, wherein an escaping hole is formed in correspondence of the nut accommodating portion, and a bolt can project into the escaping hole after passing downward through the bolt insertion hole of the nut.

* * * * *